United States Patent [19]
Moore

[11] Patent Number: 5,361,849
[45] Date of Patent: Nov. 8, 1994

[54] HAND TOOL FOR USE WITH A WATER SUPPLY

[76] Inventor: Don L. Moore, P.O. Box 1022, West Plains, Mo. 65775

[21] Appl. No.: 77,917

[22] Filed: Jun. 18, 1993

[51] Int. Cl.⁵ .............................................. A01C 23/00
[52] U.S. Cl. ...................................... 172/380; 111/7.1; 111/127; 239/271; 239/524; 239/532; 239/754; 7/114
[58] Field of Search ................. 172/380, 375, 371; 111/7.1, 127; 239/532, 754, 271, 524; 7/114; 169/54, 91, 7

[56] References Cited

U.S. PATENT DOCUMENTS

| | | |
|---|---|---|
| 1,264,556 | 4/1918 | Postel . |
| 1,408,584 | 3/1922 | Glasgow . |
| 1,525,571 | 2/1925 | Cypert . |
| 2,181,189 | 11/1939 | Lathan . |
| 2,215,132 | 9/1940 | Parker . |
| 3,143,984 | 8/1964 | Morasch .............. 111/7.1 |
| 3,326,306 | 6/1967 | Weir ..................... 175/207 |
| 4,254,717 | 3/1981 | Miller ................... 111/7.1 |
| 5,211,118 | 5/1993 | Perkins ................. 172/375 X |

FOREIGN PATENT DOCUMENTS 798638  11/1968  Canada ................ 111/7.1

*Primary Examiner*—Randolph A. Reese
*Assistant Examiner*—Christopher J. Novosad
*Attorney, Agent, or Firm*—Walker, McKenzie & Walker

[57] ABSTRACT

A hand tool for use with a water supply to allow easy cultivation and watering of gardens and the like. One end of a hollow, tubular handle is attached to a valve which, in turn, is coupled to the water supply for allowing the user of the hand tool to cause water to flow through the handle. A blade is attached to the other end of the handle. An aperture extends though the blade in communication with the cavity through the handle so that water flowing through the handle will flow through the aperture in the blade. A baffle is attached to the blade about the aperture through the blade on the side of the blade opposite the handle for deflecting water flowing through the handle and out the aperture in the blade.

9 Claims, 1 Drawing Sheet

HAND TOOL FOR USE WITH A WATER SUPPLY

BACKGROUND OF THE INVENTION

1. Field of the Invention

The present invention relates, in general, to hand tools such as garden hoes and the like, and more specifically to such hand tools that can be attached to a water supply.

2. Description of the Related Art

A preliminary patentability search has been conducted in class 111, subclass 7.1; class 239, subclasses 532 and 754, and class 172, subclasses 371 and 375.

Postel, U.S. Pat. No. 1,264,556, issued Apr. 30, 1918, discloses a garden tool in which a hollow pipe is attached to a T-shaped grubbing or cultivating head to act as a handle and to allow a water hose to be coupled to the head. The head is provided with a needle valve and a discharge port for allowing water from the water hose to be discharged against the back of the blade of the head and be deflected from the end of the blade. An anchoring pin is attached to the head.

Glasgow, U.S. Pat. No. 1,408,584, issued Mar. 7, 1922, discloses a mixing tool including a hoe head having a blade and a hollow tang; including a tubular handle having a closed end for being attached to the hollow tang of the hoe head and having an opened end for being attached to a water supply hose through a coupling; and including a sprinkler element having a pipe for being attached to the tubular handle in communication with the interior thereof, having a pair of nozzles attached to the pipe for allowing a stream of water to be directed downwardly on each side of the tang of the hoe head and against the back surface of the blade of the hoe head, and having a valve for allowing the user of the mixing tool to control the passage of water through the sprinkler element.

Cypert, U.S. Pat. No. 1,525,571, issued Feb. 10, 1925, discloses a spading fork having a plurality of tines connected horizontally by a cross member. A section of pipe or water conduit is secured to the cross member. Nozzles are formed at spaced intervals on the bottom side of the pipe so that water from within the pipe will be directed downwardly between the tines. One end of the pipe is closed while the other end is provided with a coupling member for allowing a garden hose to be attached thereto. A valve is provided at the coupling member to allow the user of the spading fork to control the flow of water from the pipe.

Latham, U.S. Pat. No. 2,181,189, issued Nov. 28, 1939, discloses a cultivating fork including a long tubular shaft which is bent at one end to form a handle. The handle terminates in a coupling for allowing a water supply hose to be attached thereto. The opposite end of the shaft is flattened to from a rectangular nozzle. A fork body is welded to the flattened end of the shaft in a manner so that the nozzle will direct water over the face of the fork body and away from the user of the fork.

Morasch, U.S. Pat. No. 3,143,984, issued Aug. 11, 1964, discloses a garden tool including a tubular body having a connection at one end for allowing a water supply hose to be connected thereto through a hand operated valve, and including a hoe head for being attached to the other end of the tubular body. The hoe head includes a flat blade welded to a tee pipe which is attached to the tubular body and which has a plurality of apertures on each side of the blade through which water can be directed against both sides of the blade.

Weir, U.S. Pat. No. 3,326,306, issued Jun. 20, 1967, discloses an apparatus for drilling a hole in the ground utilizing the flow of water. The apparatus includes an elongated hollow shaft; a handle at the upper end of the shaft for permitting the user of the apparatus to rotate the shaft; fluid supply means connected to the passage in the hollow shaft at a point below the handle for allowing a garden hose to be attached to the apparatus to direct water out the lower end of the shaft.; and a blade having a point and sharp edges attached to the lower end of the shaft.

Miller, U.S. Pat. No. 4,254,717, issued Mar. 10, 1981, discloses an irrigation implement including a hollow red having a curved upper end for forming a handle and having a tapered lower end with a discharge opening at the lower end, a pair of flanges extending beyond the lower end, and connection means on the upper end for allowing a garden hose to be connected thereto.

None of the above identified patents or prior art discloses or suggests the present invention. More specifically, none of the above identified patents or prior art discloses or suggests a hand tool including valve means for attachment to a water supply, the valve means having an opened position for allowing water from the water supply to flow therethrough and having a closed position for preventing water from the water supply from flowing therethrough; a blade having a first side and a second side and having an aperture extending between the first and second sides; a handle having a cavity extending completely therethrough, having a first end for attachment to the valve means so that water flowing through the valve means will flow through the cavity of the handle, and having a second end for attachment to the second side of the blade with the cavity of the handle in communication with the aperture through the blade so that water flowing through the cavity of the handle will flow through the aperture in the blade; and baffle means for attachment to the first side of the blade and for deflecting water flowing through the aperture in the blade.

SUMMARY OF THE INVENTION

The present invention is directed toward providing an improved hand tool. The concept of the present invention is to provide a gardening or landscaping tool that allows the user to fertilize, water, weed and plant using the same tool.

The hand tool of the present invention includes, in general, a valve means for attachment to a water supply, the valve means having an opened position for allowing water from the water supply to flow therethrough and having a closed position for preventing water from the water supply from flowing therethrough; a blade having a first side and second side and having an aperture extending between the first and second sides; a handle having a cavity extending completely therethrough, having a first end for attachment to the valve means so that water flowing through the valve means will flow through the cavity of the handle, and having a second end for attachment to the second side of the blade with the cavity of the handle in communication with the aperture through the blade so that water flowing through the cavity of the handle will flow through the aperture in the blade; and baffle means for attachment to the first side of the blade and for deflecting water flowing through the aperture in the blade.

One object of the present invention is to provide a single hand tool for gardeners, landscape workers, etc., which allows the user to fertilize, water, weed, hoe, etc., from the same tool.

Another object of the present invention is to provide such a hand tool that saves time, water, and unnecessary back-breaking labor.

Another object of the present invention is to provide such a hand tool that allows the user to water plants and the like without having to leave the water running and without having to hike back and forth to turn the water on and off, etc.

Another object of the present invention is to provide such a hand tool that makes planting and weeding easy with instant water availability, and allows the user to cause hard, dried soil to become easily workable.

Another object of the present invention is to provide such a hand tool that is not subject to rotting or splintering.

DESCRIPTION OF THE PREFERRED EMBODIMENT

Figure 3:
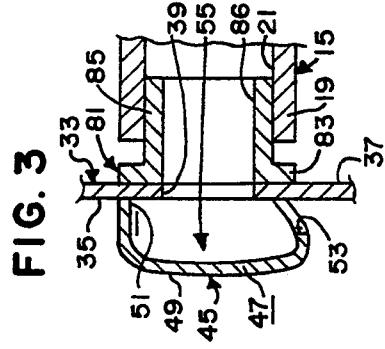
FIG. 3 is an enlarged sectional view substantially as taken on line 3—3 of FIG. 2.
Figure 2:
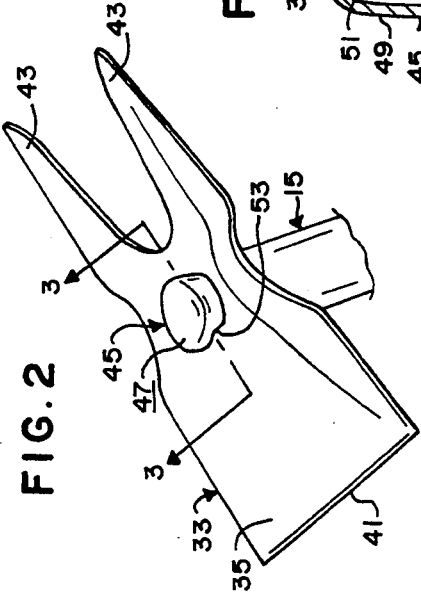
FIG. 2 is a perspective view of the blade and baffle means of the hand tool of the present invention.

The preferred embodiment of the hand tool of the present invention is shown inn FIGS. 1-4 and identified by the numeral 11. The hand tool 11 is especially designed for use with and attachment to a water supply 13 such as a standard pressurized water spigot, a standard water supply hose (e.g., a typical ½ inch, or 12.7 millimeter, plastic garden hose) or the like attached to such a water spigot, etc.

The hand tool 11 includes a hollow, tubular handle 15 having a first end 17 and a second end 19 and having a cavity 21 extending between the first and second ends 17, 19. While the handle 15 may be manufactured in various manners out of various materials and in various sizes, in the preferred embodiment of the hand tool 11, the handle 15 consists of an elongated length of standard, extra-strong galvanized steel pipe, having an overall length of approximately 52 inches (approximately 1.3 meters) with an outer diameter of approximately ⅞ inch (approximately 22.23 millimeters).

The hand tool 11 includes a valve means 23 for attachment to the first end 17 of the handle 15 for allowing the water supply 13 to be attached to the handle 15 and for allowing the user of the hand tool 11 to cause water to flow through the cavity 21 of the handle 15 from the first end 17 to the second end 19 thereof. While the valve means 23 may be of various well-known types, manufactured in various manners out of various materials and in various sizes, in the preferred embodiment of the hand tool 11, the valve means 23 consists of an off-the-shelf ball-type valve specifically designed for attachment to garden hoses and the like including a first end 25 having external threads thereon for screwing into a mating element, including a second end 27 having internal threads therein for allowing a mating element to be screwed thereinto, and including a body 29 having a control knob or handle 31 for allowing a user to open or close, or partially open or close, the valve means 23, etc. Such a valve means 23 is manufactured by Gilmour Manufacturing Co., P.O. Box 838, Somerset, Pa. 15501, as model 07V.

The hand tool 11 includes a blade 33 having a first side 35 and second side 37 and having an aperture 39 extending between the first and second sides, 35, 37. The second end 19 of the handle 15 is attached to the second side 37 of the blade 33 with the cavity 21 of the handle 15 in communication with the aperture 39 through the blade 33 so that water flowing or passing through the handle 15 will flow through the aperture 39 in the blade 33. While the blade 33 may be of various well-known types, manufactured in various manners out of various materials and in various sizes, in the preferred embodiment of the hand tool 11, the blade 33 consists of a typical metal weeding hoe blade having a cutting edge 41 on one end and one or more teeth or prongs 43 extending from the other end.

The hand tool 11 includes baffle means 45 for attachment to the first side 35 of the blade 33 and for deflecting water flowing through the handle 15 and out the aperture 39 in the blade 33. The baffle means 45 preferably includes a hollow, cylindrical body 47 having a closed first end 49 and an opened second end 51 for attachment to the blade 33 with the opened second end 51 in communication with the aperture 39 through the blade 33. The cylindrical body 47 preferably has a notch 53 at the opened second end 51 thereof for allowing water flowing through the handle 15 and out the aperture 39 in the blade 33 to flow therethrough. The notch 53 is preferably located with respect to the cutting edge 41 of the blade 33 so that any water flowing through the handle 15, out the aperture 39 in the blade 33 and through the notch 53 will be directed toward the cutting edge 41 of the blade 33 as shown diagrammatically in FIG. 1. The notch 53 preferably extends only partway from the opened second end 51 of the cylindrical body 47 toward the closed first end 49 of the cylindrical body 47 so that a cup-like cavity 55 is formed within the cylindrical body 47 adjacent the closed first end 49 thereof. The closed first end 49 of the cylindrical body 47 preferably has a slightly rounded, curved or convexed outer face surface as clearly shown in FIG. 3. Likewise, the intersection between the closed first end 49 and the cylindrical side wall of the cylindrical body 47 is preferably rounded as clearly shown in FIG. 3. While the baffle means 45 may be manufactured in various manners out of various materials and in various sizes, in the preferred embodiment of the hand tool 11, the body 47 of the baffle means 45 consists of a typical galvanized steel cap fitting or the like for welding or fixedly mounting to the first side 35 of the blade 33 in any manner now apparent to those skilled in the art with the notch 53 cut or otherwise machined or formed thereinto.

The hand tool 11 preferably includes a liquid additive means 57 for allowing a liquid additive (e.g. liquid fertilizer) from a liquid additive supply 59 (e.g., a bucket of liquid fertilizer) to be added to the water flowing out the notch 53 in the cylindrical body 47 of the baffle means 45. While the liquid additive means 57 may be of various well-known types, manufactured in various manners out of various materials and in various sizes, in the preferred embodiment of the hand tool 11, the liquid additive means 57 includes siphon means 61 for attachment to the handle 15 so that the water flowing through the handle 15 will flow through the siphon means 61 and for causing an additive to be drawn from the liquid additive supply 59 into the water flowing through the handle 15. The siphon means 61 may include a first end 63 having external threads thereon for screwing onto a mating element, including a second end 65 having internal threads thereon for allowing a mating element to be screwed thereinto, including a body 67 having a passageway extending between the first and second ends 63, 65 for allowing water to flow therethrough and having a venturi in the passageway, and including an inlet port such as a hose 69 having a first end 71 for attachment to the body 67 in communication witch a venturi or the like in the passageway through the body and having a second end 73 for positioning within the liquid additive supply 59. For a detailed description of a suitable siphon means for use in the hand tool 11, see Parker, U.S. Pat. No. 2,215,132, issued Sep. 17, 1940, incorporated herein by reference. Such a siphon means is marketed as the SYFONeX HOZON ® siphon mixer out of Copley, Ohio 44321.

The hand tool 11 preferably includes a hose member 75 for attaching the siphon means 61 of the liquid additive means 57 to the valve means 23 and, thus, to the handle 15. The hose member 75 preferably consists of a typical garden hose or the like including a first end 77 having external threads thereon for screwing into a mating element, and including a second end 79 having internal threads thereon for allowing a mating element (i.e., the first end 63 of the siphon means 61) to be screwed thereinto.

The hand tool 11 preferably includes a hollow bushing 81 for attaching the second end 19 of the handle 15 to the blade 33. Thus, the hollow bushing 81 is preferably attached to the second side 37 of the blade 33 in communication with the aperture 39 through the blade 33. The hollow bushing 81 preferably consists of a metal member having a flange portion 83 for welding or fixedly mounting to the second side 37 of the blade 33 in any manner now apparent to those skilled in the art, and having a nipple portion 85 for inserting into and welding or otherwise fixedly mounting to the second end 19 of the handle 15 with the cavity or passageway 86 through the bushing 81 in communication with the cavity 21 through the handle 15 and with the aperture 39 through the blade 33.

The hand tool 11 preferably includes a soft, resilient grip member 87 attached to the body of the handle 15. The grip member 87 preferably consists of an elongated tube of foam rubber or the like for inserting over the body of the handle 15 and secured to the handle 15 by friction, glue or the like as will now be apparent to those skilled in %he art.

The hand tool 11 preferably includes a coupling member 89 for attaching the valve means 23 to the first end 17 of the handle 15. Thus, the coupling member 89 is preferably attached to the first end 17 of the handle 15 in communication with the cavity 21 of the handle 15. The coupling member 89 preferably consists of a metal member including a nipple portion 91 for inserting into and welding or otherwise fixedly coupling to the first end 17 of the handle 15, and including a cup or sleeve portion 93 having internal threads therein for allowing a mating element (i.e., the first end 25 of the valve means 23) to be screwed thereinto with the cavity or passageway 94 through the coupling member 89 in communication with the cavity 21 through the handle 15 and with the passageway through the valve means 23.

The first end 77 of the hose member 75 may be reinforced to prevent kinking and wear and for absorbing shock, etc. Preferably, the hand tool 11 includes a separate, short length of reinforced hose 95 for preventing kinking and wear at the attachment between the valve means 23 and the water supply 13 or hose member 75 and for absorbing the shock of the weight of the water supply 13 and/or hose member 75, etc. The reinforced hose 95 includes a first end 97 having external threads thereon for screwing into a mating element (i.e., the second end 27 of the valve means 23), and including a second end 99 having internal threads therein for allowing a mating element (e.g., first end 77 of the hose member 75 or the distal end of the water supply 13) to be screwed thereinto. The body of the reinforced hose 95 may consist of a short length of strong, highly flexible plastic or rubber hose covered, wrapped or reinforced with a metal spring or the like as will now be apparent to those skilled in the art. Such a reinforced hose 95 is manufactured by American Specialties Co., P.O. Box 848, Stoulton, Mass. 02072.

Figure 1:
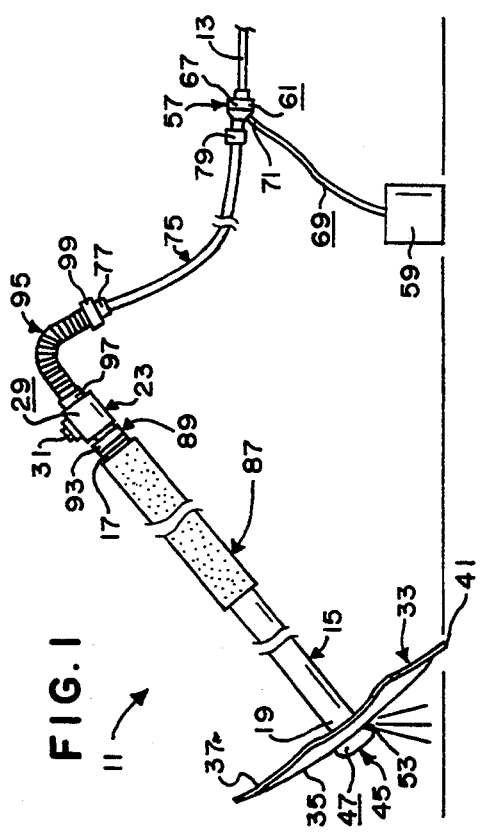
FIG. 1 is a somewhat diagrammatic side elevational view of the hand tool of the present invention shown in combination with a water supply, a water additive supply, and the ground, and with portions thereof broken away for clarity.
Figure 4:
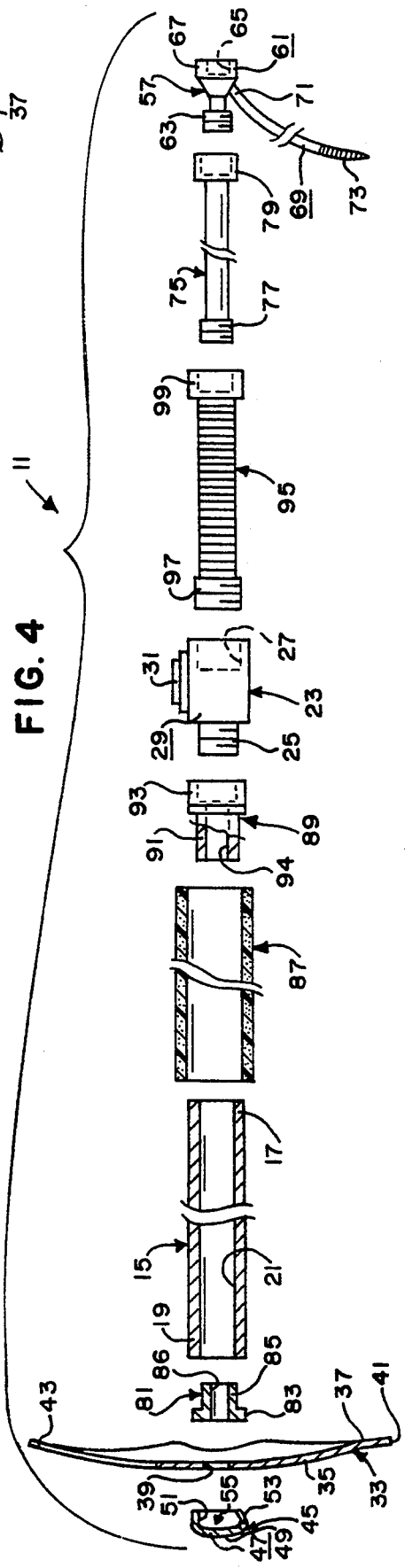
FIG. 4 is an exploded view of the hand tool of the present invention with portions thereof broken away for clarity.

The use and operation of the hand tool 11 is quite simple. To use the hand tool 11 to weed and/or water, the water supply 13 is coupled to the valve means 23, preferably through the reinforced hose 95 and, perhaps, the hose 75. The hand tool 11 can then be used in the normal manner to weed and/or cultivate. However, if it is desired to water before, during or after weeding or cultivating, the valve means 23 need only be moved to an opened position, causing water to flow or be sprayed out the notch 53 of the baffle means 45 as indicated in FIG. 1. The cylindrical and/or rounded shape of the baffle means 45 (e.g., the cylindrical shape of the cylindrical side wall of the cylindrical body 47, the convexed outer face surface of the closed first end 49 of the cylindrical body 47, and/or the rounded intersection between the closed first end 49 and the cylindrical side wall of the cylindrical body 47) allows the baffle means 45 to slide off or by-pass any hard object it may contact during normal operation such as rocks, tree roots, etc.

To use the hand tool 11 to weed and/or water while mixing a liquid additive with the water, the liquid additive means 57 is coupled between the water supply 13 and the hose member 75 and the second end 73 of the hose 69 is inserted into the liquid additive supply 59 as shown in FIG. 1. When the valve means 23 is moved to an opened position, liquid additive will be drawn into the liquid additive means 57, mixed with the water flowing through the liquid additive means 57, and flow or be sprayed out the notch 53 of the baffle means 45 with the water as indicated in FIG. 1.

To use the hand tool 11 merely to weed or cultivate, only the handle 15 and blade 33 need be used in the same manner as a typical hoe or the like (for simplicity, the valve means 23 and reinforced hose 95 are typically left on the handle 15, etc.).

Although the present invention has been described and illustrated with respect to a preferred embodiment and a preferred use therefor, it is not to be so limited since modifications and changes can be made therein which are within the full intended scope of the invention.

I claim:

1. A hand tool for use with a water supply, said hand tool comprising:
   (a) valve means for attachment to the water supply, said valve means having an opened position for allowing water from the water supply to flow therethrough and having a closed position for preventing water from the water supply from flowing therethrough;
   (b) a blade having a first side and second side and having an aperture extending between said first and second sides;
   (c) a handle having a cavity extending completely therethrough, having a first end for attachment to said valve means so that water flowing through said valve means will flow through said cavity of said handle, and having a second end for attachment to said second side of said blade with said cavity of said handle in communication with said aperture through said blade so that water flowing through said cavity of said handle will flow through said aperture in said blade; and
   (d) baffle means for attachment to said first side of said blade and for deflecting water flowing through said aperture in said blade.

2. The hand tool of claim 1 in which said baffle means includes a hollow, cylindrical body having a closed first end and an opened second end for attachment to said blade with said opened second end in communication with said aperture through said blade; said cylindrical body having a notch at said opened second end thereof for allowing water flowing through said handle and out said aperture in said blade to flow therethrough.

3. The hand tool of claim 2 in which said notch of said cylindrical body extends only partway from said opened second end of said cylindrical body to said closed first end of said cylindrical body so that a cup-like cavity is formed within said cylindrical body adjacent said closed first end thereof.

4. The hand tool of claim 2 in which said hand tool is for additional use with a liquid additive supply, and in which is included liquid additive means for allowing liquid additive from the liquid additive supply to be added to the water flowing through said handle, through said aperture in said blade, and out said notch in said cylindrical body of said baffle means.

5. The hand tool of claim 4 in which said liquid additive means includes siphon means for attachment to said handle and to the water supply so that the water flowing through said handle will flow through said siphon means and for attachment to the liquid additive supply so that liquid additive from said liquid additive supply will be drawn into the water flowing through said handle.

6. The hand tool of claim 5 in which is included a hose member for attaching said siphon means of said liquid additive means to said valve means and, thus, to said handle.

7. The hand tool of claim 2 in which said closed first end of said cylindrical body of said baffle means has a convexed outer face surface.

8. A hand tool for use with a water supply and a liquid additive supply, said hand tool comprising:
   (a) a blade having a first side and second side and having an aperture extending between said first and second sides;
   (b) baffle means including a hollow, cylindrical body having a closed first end and an opened second end and being attached to said blade with said opened second end in communication with said aperture through said blade; said cylindrical body having a downwardly directed notch at said opened second end thereof; said notch of said cylindrical body extending only partway from said opened second end of said cylindrical body to said closed first end of said cylindrical body so that a cup-like cavity is formed within said cylindrical body adjacent said closed first end thereof;
   (c) a hollow bushing attached to said second side of said blade in communication with said aperture through said blade;
   (d) a tubular handle including an elongated body having a first end and a second end, said handle having a cavity extending through said body thereof between said first and second ends, said second end of said body of said handle being attached to said hollow bushing so that said cavity of said handle is in communication with said aperture through said blade;
   (e) a soft, resilient grip member attached to said body of said handle;
   (f) a coupling member attached to said first end of said body of said handle in communication with said cavity through said body of said handle;
   (g) a valve means attached to said coupling member, said valve means having an opened position and a closed position;
   (h) a reinforced hose having a first end attached to said valve means and having a second end;
   (i) an elongated hose member having a first end attached to said second end of said reinforced hose and having a second end; and
   (j) a liquid additive means having a first end attached to said second end of said hose member, having a second end for attachment to the water supply, and having an inlet port for attachment to the liquid additive supply and for drawing liquid additive from said liquid additive supply when water flows from said second end of said liquid additive means to said first end of said liquid additive means so that when said valve means is in said opened position, water from the water supply will flow through said liquid additive means, drawing liquid additive from said liquid additive supply thereinto, and so that the water-liquid additive combination will then flow through said hose member, through said valve means, through said coupling member, through said cavity of said handle, through said hollow bushing, through said aperture of said blade, and out said downwardly direct notch of said cylindrical body of said baffle means.

9. The hand tool of claim 8 in which said closed first end of said cylindrical body of said baffle means has a convexed outer face surface.

* * * * *